(12) United States Patent
Chen

(10) Patent No.: US 12,437,798 B2
(45) Date of Patent: Oct. 7, 2025

(54) VOLTAGE REGULATOR AND MEMORY DEVICE

(71) Applicant: NANYA TECHNOLOGY CORPORATION, New Taipei (TW)

(72) Inventor: Chih-Jen Chen, Kaohsiung (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 175 days.

(21) Appl. No.: 18/459,453

(22) Filed: Sep. 1, 2023

(65) Prior Publication Data

US 2025/0078901 A1   Mar. 6, 2025

(51) Int. Cl.
*G11C 5/14* (2006.01)
*G11C 11/4074* (2006.01)

(52) U.S. Cl.
CPC .......... *G11C 11/4074* (2013.01); *G11C 5/146* (2013.01); *G11C 5/147* (2013.01)

(58) Field of Classification Search
CPC ...... G11C 11/4074; G11C 5/146; G11C 5/147
See application file for complete search history.

(56) References Cited

U.S. PATENT DOCUMENTS

| 7,280,407 | B2* | 10/2007 | Umezawa | G11C 5/147 365/189.11 |
|---|---|---|---|---|
| 7,940,569 | B2 | 5/2011 | Ito et al. | |
| 11,355,211 | B2 | 6/2022 | Kunz et al. | |
| 2010/0182867 | A1 | 7/2010 | Lee | |
| 2014/0016425 | A1* | 1/2014 | Lee | G11C 29/021 307/31 |
| 2016/0035397 | A1* | 2/2016 | Pilo | G11C 11/417 365/154 |
| 2020/0278714 | A1* | 9/2020 | Kitani | G11C 16/30 |
| 2022/0093204 | A1 | 3/2022 | Chaudhry et al. | |

FOREIGN PATENT DOCUMENTS

| CN | 1691100 | 11/2005 |
|---|---|---|
| CN | 103543779 | 1/2014 |

OTHER PUBLICATIONS

"Office Action of Taiwan Counterpart Application", issued on Jul. 9, 2024, p. 1-p. 4.

* cited by examiner

*Primary Examiner* — Min Huang
(74) *Attorney, Agent, or Firm* — JCIPRNET

(57) ABSTRACT

The disclosure provides a voltage regulator and a memory device. The voltage regulator includes a voltage generator and a bias circuit. The bias circuit dynamically adjusts a bias voltage based on a power saving mode signal of the memory device. The voltage generator adjusts a bias current of the voltage generator based on the bias voltage, wherein the bias current affects a slew rate of a target voltage. The voltage generator generates the target voltage to a driving circuit configured to drive a memory cell array in the memory device.

21 Claims, 4 Drawing Sheets

VOLTAGE REGULATOR AND MEMORY DEVICE

BACKGROUND

Technical Field

The disclosure relates to an electronic circuit, and particularly relates to a voltage regulator and a memory device.

Description of Related Art

A dynamic random-access memory (DRAM) device and/or other electronic circuits require a voltage regulator to generate a stable voltage. For example, in a DRAM device, the voltage generator may generate the negative voltage VNWL required by the word line (WL) of the memory cell array. How to further reduce the power consumption of the voltage regulator in the power saving mode is one of the many technical issues in the field of DRAM technology.

SUMMARY

The disclosure provide a voltage regulator and a memory device, so as to dynamically adjust a bias current based on a power saving mode signal of the memory device, thereby reducing the power consumption of the voltage regulator in the power saving mode.

In an embodiment of the disclosure, the voltage regulator includes a voltage generator and a bias circuit. The bias circuit is coupled to the voltage generator to provide a bias voltage. The bias circuit dynamically adjusts the bias voltage based on the power saving mode signal of the memory device. The voltage generator is configured to generate a target voltage to a driving circuit configured to drive a memory cell array in the memory device. The voltage generator adjusts the bias current of the voltage generator based on the bias voltage, in which the bias current affects the slew rate (SR) of the target voltage.

In an embodiment of the disclosure, the memory device includes a command decoder, a memory cell array, a driving circuit, and a voltage regulator. The command decoder is configured to selectively generate a power saving mode signal. The driving circuit is configured to drive the memory cell array. The voltage regulator is coupled to the command decoder to receive the power saving mode signal. A voltage regulator is coupled to the driving circuit to provide a target voltage. The driving circuit uses the target voltage to turn off at least one word line (WL) of the memory cell array. The voltage regulator dynamically adjusts the bias current of the voltage regulator based on the power saving mode signal, in which the bias current affects the SR of the target voltage.

Based on the above, the voltage regulator according to the embodiments of the disclosure can dynamically adjust the bias current based on the power saving mode signal of the memory device. For example, when the power saving mode signal indicates "the memory device enters the power saving mode", the bias circuit can dynamically adjust the bias voltage based on the power saving mode signal so as to reduce the bias current of the voltage generator from a normal operation current to a power saving mode current. Therefore, the power consumption of the voltage regulator in the power saving mode can be effectively reduced. Conversely, when the power saving mode signal indicates "the memory device exits the power saving mode", the bias circuit can dynamically adjust the bias voltage based on the power saving mode signal so as to adjust the bias current of the voltage generator from a power saving mode current back to a normal operation current. Therefore, in a normal operation mode, the target voltage output by the voltage regulator can be maintained at the rated slew rate.

In order to make the above-mentioned features and advantages of the disclosure more comprehensible, several embodiments accompanied with drawings are described in detail as follows.

DESCRIPTION OF THE EMBODIMENTS

Figure 1:
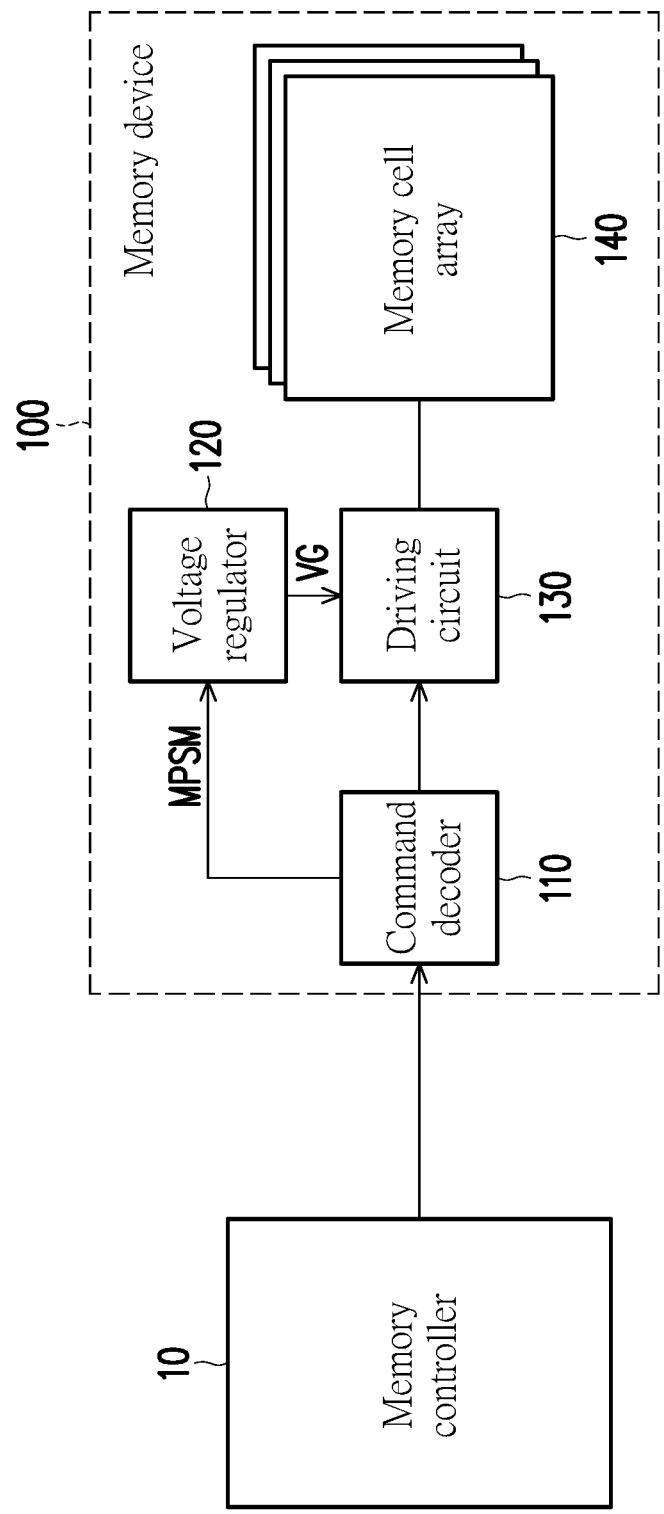
FIG. 1 is a schematic circuit block diagram of a memory device according to an embodiment of the disclosure.

The term "coupled (or connected)" used throughout the specification of the disclosure (including the appended claims) may refer to any direct or indirect means of connection. For example, if it is described in the text that the first device is coupled (or connected) to the second device, it should be interpreted as saying that the first device may be directly connected to the second device, or that the first device may be connected indirectly to the second device through other devices or some kind of connection means. The terms "first" and "second" mentioned throughout the specification of the disclosure (including the appended claims) are used to name the name of an element, or to distinguish different embodiments or ranges, and are not used to limit the upper limit or the lower limit of the quantity of the element, nor to limit the order of the element. In addition, wherever possible, elements/members/steps using the same reference numerals in the drawings and embodiments represent the same or similar parts. For the elements/members/steps using the same reference numerals or using the same terms, reference may be made to related descriptions in different embodiments.

FIG. 1 is a schematic circuit block diagram of a memory device 100 according to an embodiment of the disclosure. Based on the actual design, the memory device 100 may be a dynamic random-access memory (DRAM) device or other memory devices. Based on the control of a memory controller 10, the memory device 100 may provide a data access service to the memory controller 10. In the embodiment shown in FIG. 1, the memory device 100 includes a command decoder 110, a voltage regulator 120, a driving circuit 130, and a memory cell array 140. Based on the control of the command decoder 110, the driving circuit 130 may drive the memory cell array 140. It should be noted that, based on the actual design, the memory device 100 may further include other functional blocks not shown in FIG. 1, such as well-known functional blocks or other functional blocks.

The command decoder 110 is coupled to the memory controller 10 to receive an access command and other commands. The command decoder 110 may decode the command of the memory controller 10, and then send a corresponding control signal to one or more corresponding functional blocks (for example, the driving circuit 130) in the memory device 100 according to a decoding result. For example, according to the decoding result, the command decoder 110 may send an access control signal to the driving circuit 130 so as to perform data accessing to the memory cell array 140. This embodiment does not limit the implementation manner of the command decoder 110, the driving circuit 130, and the memory cell array 140. Based on the actual design, the command decoder 110 may include a well-known command decoder or other command decoding circuits, the driving circuit 130 may include a well-known memory cell driving circuit or other driving circuits, and the memory cell array 140 may include a well-known memory cell array or other memory cell circuits. Therefore, the implementation manners of the command decoder 110, the driving circuit 130, and the memory cell array 140 are not detailed here.

Based on the control of the memory controller 10, the memory device 100 may enter a power saving mode. Based on the actual operation, the power saving mode may be a maximum power saving mode conforming to the DRAM specification or other power saving modes. For example, according to the decoding result, the command decoder 110 may selectively generate a power saving mode signal MPSM to the one or more corresponding functional blocks (for example, the voltage regulator 120) in the memory device 100. The voltage regulator 120 is coupled to the driving circuit 130 to provide a target voltage VG. The driving circuit 130 may use the target voltage VG to turn off at least one word line (WL) of the memory cell array 140. The voltage regulator 120 is coupled to the command decoder 110 to receive the power saving mode signal MPSM. The voltage regulator 120 can dynamically adjust the bias current of the voltage regulator 120 based on the power saving mode signal MPSM, in which the bias current affects the slew rate (SR) of the target voltage VG.

The voltage regulator 120 can dynamically adjust the bias current of the voltage regulator 120 based on the power saving mode signal MPSM of the memory device 100. For example, when the power saving mode signal MPSM indicates "the memory device 100 enters the power saving mode", the voltage regulator 120 may reduce the bias current of the voltage regulator 120 from a normal operation current to a power saving mode current. Therefore, the power consumption of the voltage regulator 120 in the power saving mode can be effectively reduced. Conversely, when the power saving mode signal MPSM indicates "the memory device 100 exits the power saving mode", the voltage regulator 120 may adjust the bias current of the voltage regulator 120 from the power saving mode current to the normal operation current. Therefore, in a normal operation mode, the target voltage VG output by the voltage regulator 120 can be maintained at the rated slew rate.

Figure 2:
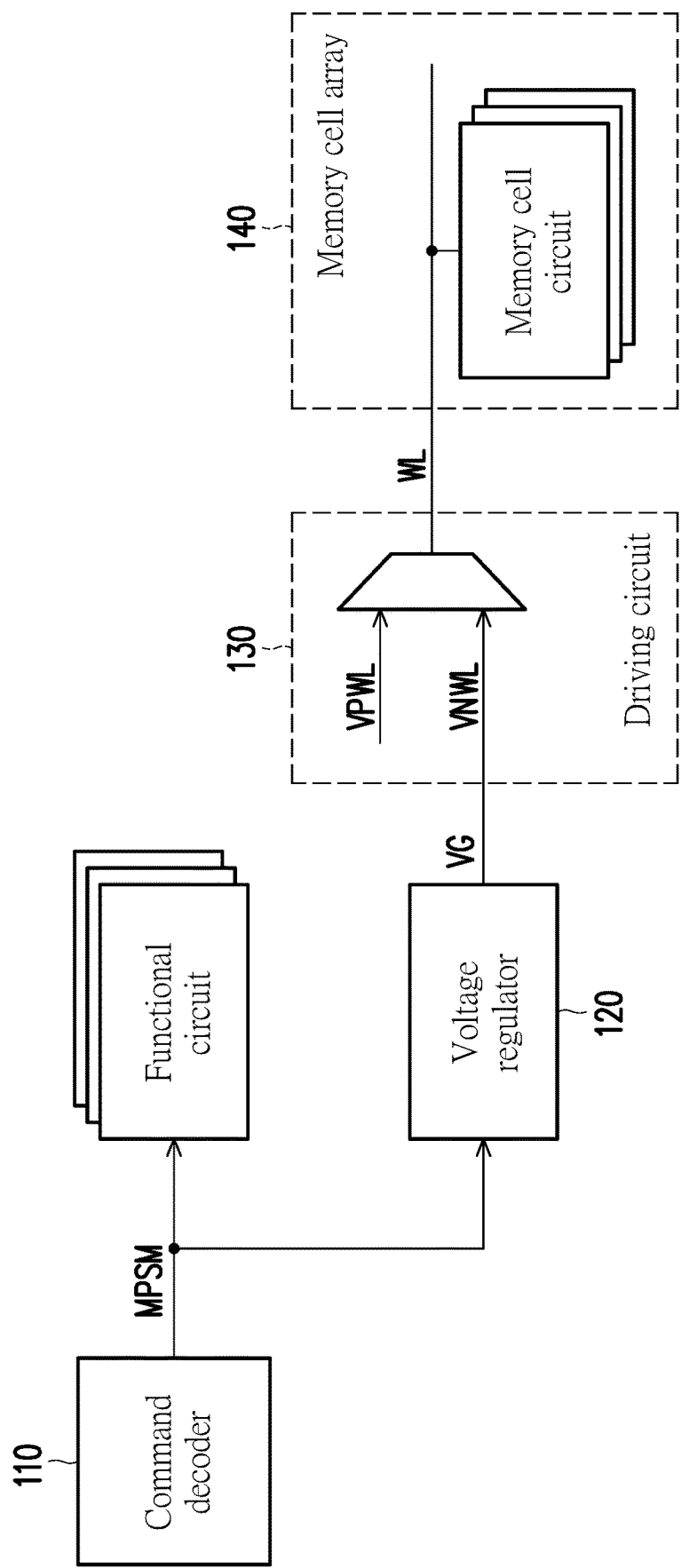
FIG. 2 is a schematic circuit block diagram of a driving circuit according to an embodiment of the disclosure.

FIG. 2 is a schematic circuit block diagram of the driving circuit 130 according to an embodiment of the disclosure. FIG. 2 shows a part of the driving circuit 130. The driving circuit 130 and the memory cell array 140 shown in FIG. 2 may be used as one of many implementation examples of the driving circuit 130 and the memory cell array 140 shown in FIG. 1. In the embodiment shown in FIG. 2, a negative voltage VNWL is used as a specific example of the output target voltage VG of the voltage regulator 120. The voltage regulator 120 may generate a driving voltage required by the word line WL of the memory cell array 140, such as the negative voltage VNWL and/or a positive voltage VPWL. Based on the control of the command decoder 110, the driving circuit 130 may choose to use the negative voltage VNWL (the target voltage VG) to turn off the word line WL of the memory cell array 140, or choose to use the positive voltage VPWL to turn on the word line WL of the memory cell array 140.

According to the decoding result, the command decoder 110 may selectively generate the power saving mode signal MPSM to one or more functional circuits in the memory device 100. The voltage regulator 120 can dynamically adjust the bias current of the voltage regulator 120 based on the power saving mode signal MPSM sent to the functional circuit by the command decoder 110. For example, when the power saving mode signal MPSM indicates "the memory device 100 enters the power saving mode", the voltage regulator 120 can reduce the bias current from the normal operation current to the power saving mode current. Conversely, when the power saving mode signal MPSM indicates "the memory device 100 exits the power saving mode", the voltage regulator 120 can adjust the bias current from the power saving mode current to the normal operation current.

Figure 3:
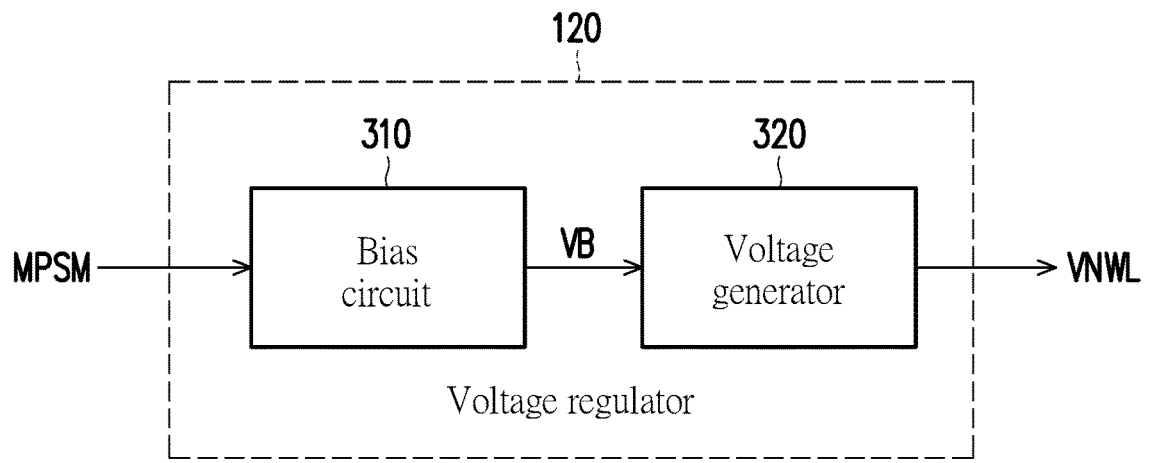
FIG. 3 is a schematic circuit block diagram of a voltage regulator according to an embodiment of the disclosure.

FIG. 3 is a schematic circuit block diagram of the voltage regulator 120 according to an embodiment of the disclosure. The voltage regulator 120 shown in FIG. 3 may be used as one of many implementation examples of the voltage regulator 120 shown in FIG. 1. In the embodiment shown in FIG. 3, the voltage regulator 120 includes a bias circuit 310 and a voltage generator 320. The voltage generator 320 is configured to generate the target voltage to the driving circuit 130. In the embodiment shown in FIG. 3, the negative voltage VNWL is still used as a specific example of the target voltage VG output by the voltage regulator 120. The voltage generator 320 may generate the negative voltage VNWL (the target voltage) required to turn off the word line WL.

The bias circuit 310 is coupled to the command decoder 110 to receive the power saving mode signal MPSM. The bias circuit 310 is coupled to the voltage generator 320 to provide a bias voltage VB. The bias circuit 310 can dynamically adjust the bias voltage VB based on the power saving mode signal MPSM. The voltage generator 320 adjusts the bias current of the voltage generator 320 based on the bias voltage VB, in which the bias current can affect the slew rate (SR) of the negative voltage VNWL (the target voltage). When the power saving mode signal MPSM indicates "the memory device 100 enters the power saving mode" (the power saving mode may be the maximum power saving mode conforming to the DRAM specification or other power saving modes), the bias circuit 310 can dynamically adjust the bias voltage VB so as to reduce the bias current of the voltage generator 320 from the normal operation current to the power saving mode current. Therefore, the power consumption of the voltage regulator 120 in the power saving mode can be effectively reduced. Conversely, when the power saving mode signal MPSM indicates "the memory device 100 exits the power saving mode", the bias circuit 310 can dynamically adjust the bias voltage VB so as to increase the bias current of the voltage generator 320 from the power saving mode current to normal operation current. Therefore, in the normal operation mode, the negative voltage VNWL (the target voltage) output by the voltage regulator 120 can be maintained at the rated slew rate.

Figure 4:
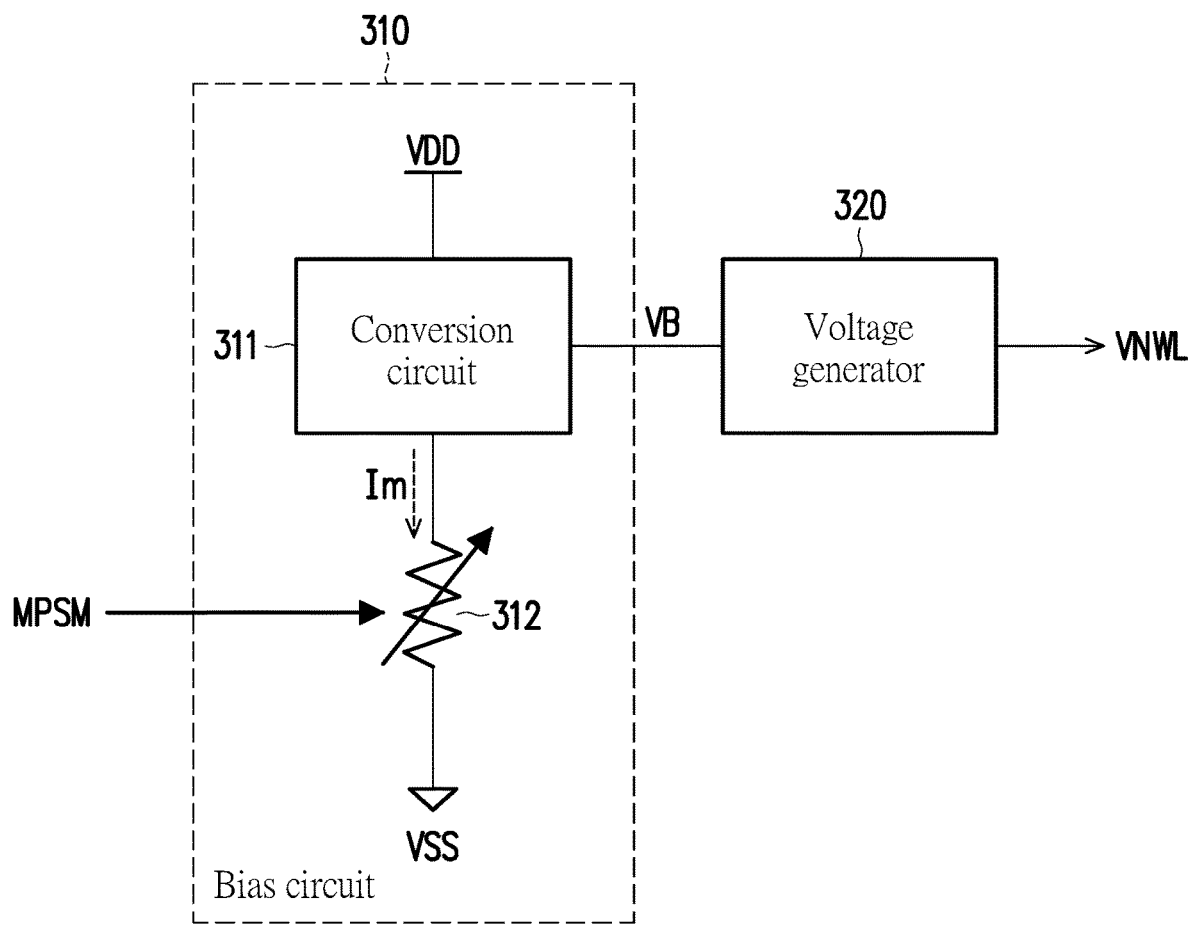
FIG. 4 is a schematic circuit block diagram of a bias circuit according to an embodiment of the disclosure.

FIG. 4 is a schematic circuit block diagram of the bias circuit 310 according to an embodiment of the disclosure. The bias circuit 310 shown in FIG. 4 may be used as one of many implementation examples of the bias circuit 310 shown in FIG. 3. In the embodiment shown in FIG. 4, the bias circuit 310 includes a conversion circuit 311 and a variable resistor circuit 312. The variable resistor circuit 312 is controlled by the power saving mode signal MPSM. The variable resistor circuit 312 dynamically adjusts a master bias current Im flowing through the variable resistor circuit 312 based on the power saving mode signal MPSM. The conversion circuit 311 is coupled to the variable resistor circuit 312. The conversion circuit 311 may convert the master bias current Im into the bias voltage VB for the voltage generator 320. This embodiment does not limit the implementation manner of the conversion circuit 311. For example, based on the actual design, the conversion circuit 311 may include a well-known current-to-voltage converter or other current voltage conversion circuits.

When the power saving mode signal MPSM indicates "the memory device 100 enters the power saving mode", the variable resistor circuit 312 can dynamically reduce the master bias current Im (adjust the bias voltage VB) so as to reduce the bias current of the voltage generator 320 from the normal operation current to the power saving mode current. Therefore, the power consumption of the voltage regulator 120 in the power saving mode can be effectively reduced. Conversely, when the power saving mode signal MPSM indicates "the memory device 100 exits the power saving mode", the variable resistor circuit 312 can dynamically increase the master bias current Im (adjust the bias voltage VB) so as to increase the bias current of the voltage generator 320 from the power saving mode current to the normal operation current. Therefore, in the normal operation mode, the negative voltage VNWL (the target voltage) output by the voltage regulator 120 can be maintained at the rated slew rate.

Figure 5:
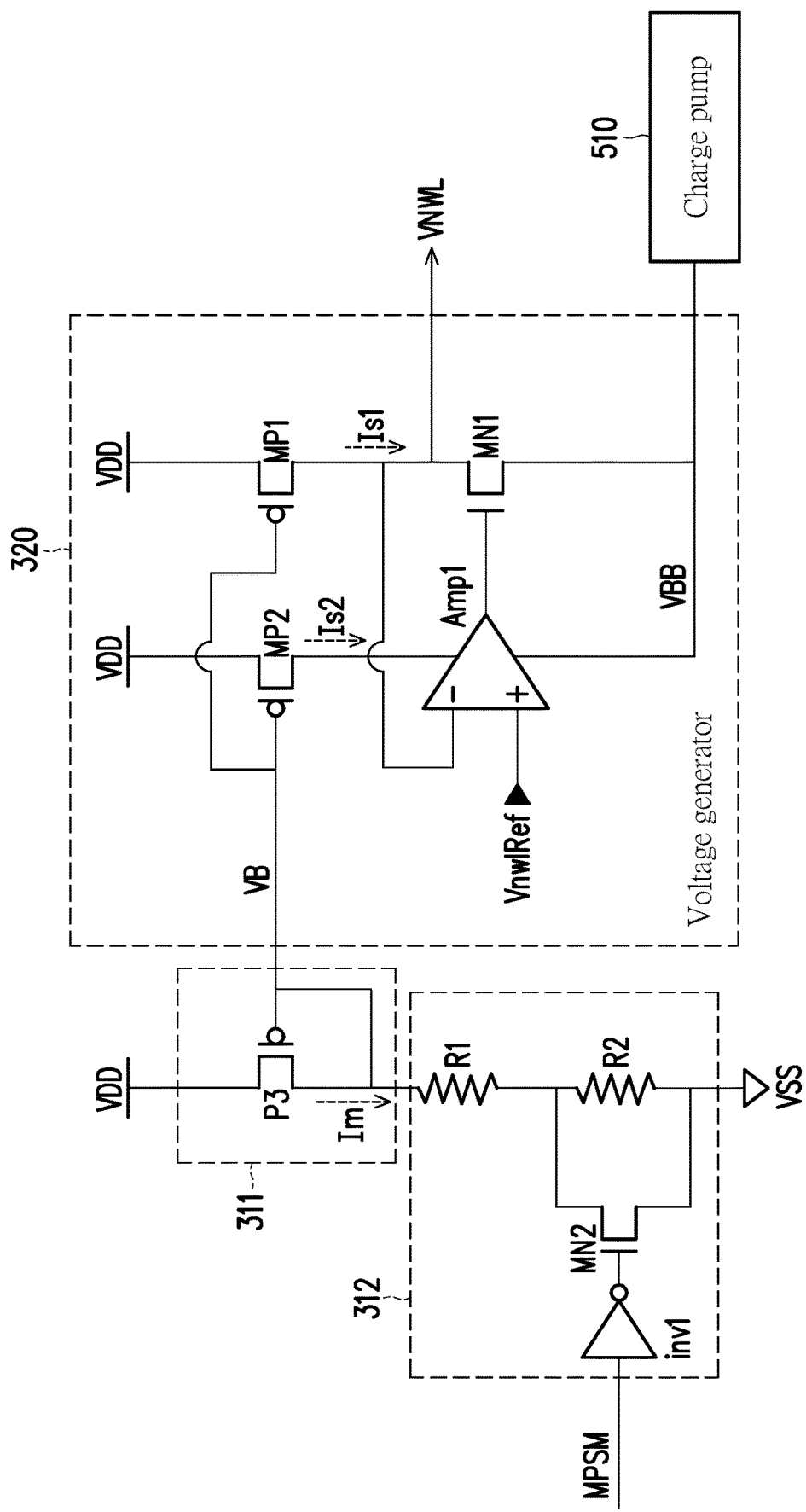
FIG. 5 is a schematic circuit block diagram of a conversion circuit, a variable resistor circuit, and a voltage generator according to an embodiment of the disclosure.

FIG. 5 is a schematic circuit block diagram of the conversion circuit 311, the variable resistor circuit 312, and the voltage generator 320 according to an embodiment of the disclosure. The conversion circuit 311 and the variable resistor circuit 312 shown in FIG. 5 may be used as one of many implementation examples of the conversion circuit 311 and the variable resistor circuit 312 shown in FIG. 4. The voltage generator 320 shown in FIG. 5 may be used as one of many implementation examples of the voltage generator 320 shown in FIG. 3. In the embodiment shown in FIG. 5, the conversion circuit 311 includes a transistor P3, the variable resistor circuit 312 includes an inverter inv1, a switch MN2, a resistor R1, and a resistor R2, and the voltage generator 320 includes a transistor MP1, a transistor MP2, a transistor MN1, and an amplifier Amp1.

A first terminal (e.g. the source) of the transistor MP1 and a first terminal (e.g. the source) of the transistor MP2 receive a supply voltage VDD. A control terminal (e.g. the gate) of the transistor MP1 and a control terminal (e.g. the gate) of the transistor MP2 are coupled to the conversion circuit 311 of the bias circuit 310 to receive the bias voltage VB. A second terminal (e.g. the drain) of the transistor MP2 is coupled to the supply voltage terminal of the amplifier Amp1. A first input terminal of the amplifier Amp1 (e.g. a non-inverting input terminal) receive a reference voltage VnwlRef. The level of the reference voltage VnwlRef may be determined based on the actual design. A control terminal (e.g. the gate) of the transistor MN1 is coupled to an output terminal of the amplifier Amp1. A first terminal (e.g. the drain) of the transistor MN1 is coupled to a second terminal (e.g. the drain) of the transistor MP1 to provide the negative voltage VNWL (the target voltage) to the driving circuit 130. The second terminal of the transistor MP1 is also coupled to a second input terminal of the amplifier Amp1 (e.g. an inverting input terminal).

The second terminal (e.g. the source) of the transistor MN1 and the reference voltage terminal of the amplifier Amp1 receive a reference voltage VBB. The reference voltage VBB may be provided by any power supply circuit (such as a charge pump 510). In the embodiment shown in FIG. 5, the supply voltage VDD is a positive voltage, and the reference voltage VBB is a negative voltage. This embodiment does not limit the implementation manner of the charge pump 510. For example, based on the actual design, the charge pump 510 may include a well-known charge pump or other power supply circuits.

The first terminal (e.g. the source) of the transistor P3 receives the supply voltage VDD. The control terminal (e.g. the gate) and the second terminal (e.g. the drain) of the transistor P3 are coupled to the resistor R1 of the variable resistor circuit 312. The transistor P3 may convert the master bias current Im to the bias voltage VB. The second terminal of the transistor P3 provides the bias voltage VB to the transistors MP1 and MP2 of the voltage generator 320. The input terminal of the inverter inv1 receives the power saving mode signal MPSM. The control terminal of the switch MN2 is coupled to the output terminal of the inverter inv1. The first terminal of the resistor R1 is coupled to the conversion circuit 311. The first terminal of the resistor R2 is coupled to the second terminal of the resistor R1 and the first terminal of the switch MN2. The second terminal of the resistor R2 is coupled to a reference voltage VSS and the second terminal of the switch MN2.

When the power saving mode signal MPSM is at a high logic level (indicating "the memory device 100 enters the power saving mode"), the switch MN2 is turned off so that the resistance value of the variable resistor circuit 312 increases, thereby reducing the master bias current Im (increasing the bias voltage VB). Based on the master bias current Im being reduced, slave bias currents Is1 and Is2 (the bias current of the voltage generator 320) flowing through the transistors MP1 and MP2 are also correspondingly reduced. Therefore, the bias current of the voltage generator 320 can be reduced from the normal operation current to the power saving mode current, so that the power consumption of the voltage regulator 120 in the power saving mode can be effectively reduced. Conversely, when the power saving mode signal MPSM is at a low logic level (indicating "the memory device 100 exits the power saving mode"), the switch MN2 is turned on so that the resistance value of the variable resistor circuit 312 decreases, thereby increasing the master bias current Im (reducing the bias voltage VB). Based on the master bias current Im being increased, the slave bias currents Is1 and Is2 are also correspondingly increased. Therefore, the bias current of the voltage generator 320 can be increased from the power saving mode current to the normal operation current, so that in the normal operation mode, the negative voltage VNWL (the target voltage) output by the voltage regulator 120 can be maintained at the rated slew rate.

In summary, the voltage regulator 120 of the above embodiments can dynamically adjust the bias currents Im, Is1, and Is2 based on the power saving mode signal MPSM of the memory device 100. For example, when the power saving mode signal MPSM indicates "the memory device 100 enters the power saving mode", the bias circuit 310 can dynamically adjust the resistance value of the variable resistor circuit 312 based on the power saving mode signal MPSM, so as to reduce the bias currents Im, Is1, and Is2. Therefore, the power consumption of the voltage regulator 120 in the power saving mode can be effectively reduced. Conversely, when the power saving mode signal MPSM indicates "the memory device 100 exits the power saving mode", the bias circuit 310 can dynamically adjust the resistance value of the variable resistor circuit 312 based on the power saving mode signal MPSM, so as to increase the bias currents Im, Is1, and Is2. Therefore, in the normal operation mode, the target voltage VG (e.g. the negative voltage VNWL) output by the voltage regulator 120 can be maintained at the rated slew rate.

Although the disclosure has been disclosed as the embodiments mentioned above, the embodiments are not used to limit the disclosure. Persons with ordinary knowledge in the technical field may make some changes and modifications without departing from the spirit and scope of the disclosure. Therefore, the protection scope of the disclosure shall be defined by the appended claims.

What is claimed is:

1. A voltage regulator, comprising:
   a voltage generator generating a target voltage for a driving circuit configured to drive a memory cell array in a memory device, wherein the voltage generator adjusts a bias current of the voltage generator based on a bias voltage, and the bias current affects a slew rate of the target voltage; and
   a bias circuit coupled to the voltage generator to provide the bias voltage, wherein the bias circuit dynamically adjusts the bias voltage based on a power saving mode signal of the memory device, and the bias circuit comprises:
      a variable resistor circuit controlled by the power saving mode signal, wherein the variable resistor circuit dynamically adjusts a master bias current flowing through the variable resistor circuit based on the power saving mode signal; and
      a conversion circuit coupled to the variable resistor circuit, wherein the conversion circuit converts the master bias current into the bias voltage.

2. The voltage regulator as claimed in claim 1, wherein
   in response to the power saving mode signal indicating the memory device entering a power saving mode, the bias circuit dynamically adjusts the bias voltage so as to reduce the bias current of the voltage generator from a normal operation current to a power saving mode current; and
   in response to the power saving mode signal indicating the memory device exiting the power saving mode, the bias circuit dynamically adjusts the bias voltage so as to increase the bias current of the voltage generator from the power saving mode current to the normal operation current.

3. The voltage regulator as claimed in claim 1, wherein the power saving mode signal comprises a maximum power saving mode signal conforming to a dynamic random-access memory specification.

4. The voltage regulator as claimed in claim 1, wherein the driving circuit uses the target voltage to turn off at least one word line of the memory cell array.

5. The voltage regulator as claimed in claim 4, wherein the target voltage is a negative voltage.

6. The voltage regulator as claimed in claim 1, wherein
   in response to the power saving mode signal indicating the memory device entering a power saving mode, the variable resistor circuit reduces the master bias current so as to reduce the bias current of the voltage generator from a normal operation current to a power saving mode current; and
   in response to the power saving mode signal indicating the memory device exiting the power saving mode, the variable resistor circuit increases the master bias current so as to increase the bias current of the voltage generator from the power saving mode current to the normal operation current.

7. The voltage regulator as claimed in claim 1, wherein the variable resistor circuit comprises:
   an inverter configured to receive the power saving mode signal;
   a switch having a control terminal coupled to an output terminal of the inverter;
   a first resistor having a first terminal coupled to the conversion circuit; and
   a second resistor having a first terminal coupled to a second terminal of the first resistor and a first terminal of the switch, wherein a second terminal of the second resistor is coupled to a reference voltage and a second terminal of the switch.

8. The voltage regulator as claimed in claim 1, wherein the conversion circuit comprises:
   a transistor having a first terminal configured to receive a supply voltage, wherein a control terminal and a second terminal of the transistor are coupled to the variable resistor circuit, and the second terminal of the transistor provides the bias voltage to the voltage generator.

9. The voltage regulator as claimed in claim 1, wherein the voltage generator comprises:
   an amplifier having a first input terminal configured to receive a first reference voltage;
   a first transistor having a first terminal configured to receive a supply voltage, wherein a control terminal of the first transistor is coupled to the bias circuit to receive the bias voltage, and a second terminal of the first transistor is coupled to a second input terminal of the amplifier; and
   a second transistor having a first terminal coupled to the second terminal of the first transistor to provide the target voltage for the driving circuit, wherein a control terminal of the second transistor is coupled to an output terminal of the amplifier, and a second terminal of the second transistor is configured to receive a second reference voltage.

10. The voltage regulator as claimed in claim 9, wherein the supply voltage is a positive voltage, and the second reference voltage is a negative voltage.

11. The voltage regulator as claimed in claim 9, wherein the voltage generator further comprises:
    a third transistor having a first terminal configured to receive the supply voltage, wherein a control terminal of the third transistor is coupled to the bias circuit to receive the bias voltage, a second terminal of the third transistor is coupled to a supply voltage terminal of the amplifier, and a reference voltage terminal of the amplifier is configured to receive the second reference voltage.

12. A memory device, comprising:
    a command decoder configured to selectively generate a power saving mode signal;
    a memory cell array;
    a driving circuit configured to drive the memory cell array; and
    a voltage regulator, coupled to the command decoder to receive the power saving mode signal, and coupled to the driving circuit to provide a target voltage, wherein the driving circuit uses the target voltage to turn off at least one word line of the memory cell array, the voltage regulator dynamically adjusts a bias current of the voltage regulator based on the power saving mode signal, the bias current affects a slew rate of the target voltage, and the voltage regulator comprises:
- a voltage generator generating the target voltage for the driving circuit, wherein the voltage generator adjusts the bias current of the voltage generator based on a bias voltage; and
- a bias circuit coupled to the voltage generator to provide the bias voltage, wherein the bias circuit dynamically adjusts the bias voltage based on the power saving mode signal, and the bias circuit comprises:
    - a variable resistor circuit controlled by the power saving mode signal, wherein the variable resistor circuit dynamically adjusts a master bias current flowing through the variable resistor circuit based on the power saving mode signal; and
    - a conversion circuit coupled to the variable resistor circuit, wherein the conversion circuit converts the master bias current into the bias voltage.

13. The memory device as claimed in claim 12, wherein
in response to the power saving mode signal indicating the memory device entering a power saving mode, the bias circuit dynamically adjusts the bias voltage so as to reduce the bias current of the voltage generator from a normal operation current to a power saving mode current; and
in response to the power saving mode signal indicating the memory device exiting the power saving mode, the bias circuit dynamically adjusts the bias voltage so as to increase the bias current of the voltage generator from the power saving mode current to the normal operation current.

14. The memory device as claimed in claim 12, wherein the power saving mode signal comprises a maximum power saving mode signal conforming to a dynamic random-access memory specification.

15. The memory device as claimed in claim 12, wherein the target voltage is a negative voltage.

16. The memory device as claimed in claim 12, wherein,
in response to the power saving mode signal indicating the memory device entering a power saving mode, the variable resistor circuit reduces the master bias current so as to reduce the bias current of the voltage generator from a normal operation current to a power saving mode current; and
in response to the power saving mode signal indicating the memory device exiting the power saving mode, the variable resistor circuit increases the master bias current so as to increase the bias current of the voltage generator from the power saving mode current to the normal operation current.

17. The memory device as claimed in claim 12, wherein the variable resistor circuit comprises:
- an inverter configured to receive the power saving mode signal;
- a switch having a control terminal coupled to an output terminal of the inverter;
- a first resistor having a first terminal coupled to the conversion circuit; and
- a second resistor having a first terminal coupled to a second terminal of the first resistor and a first terminal of the switch, wherein a second terminal of the second resistor is coupled to a reference voltage and a second terminal of the switch.

18. The memory device as claimed in claim 12, wherein the conversion circuit comprises:
- a transistor having a first terminal configured to receive a supply voltage, wherein a control terminal and a second terminal of the transistor are coupled to the variable resistor circuit, and the second terminal of the transistor provides the bias voltage to the voltage generator.

19. The memory device as claimed in claim 12, wherein the voltage generator comprises:
- an amplifier having a first input terminal configured to receive a first reference voltage;
- a first transistor having a first terminal configured to receive a supply voltage, wherein a control terminal of the first transistor is coupled to the bias circuit to receive the bias voltage, and a second terminal of the first transistor is coupled to a second input terminal of the amplifier; and
- a second transistor having a first terminal coupled to the second terminal of the first transistor to provide the target voltage for the driving circuit, wherein a control terminal of the second transistor is coupled to an output terminal of the amplifier, and a second terminal of the second transistor is configured to receive a second reference voltage.

20. The memory device as claimed in claim 19, wherein the supply voltage is a positive voltage, and the second reference voltage is a negative voltage.

21. The memory device as claimed in claim 19, wherein the voltage generator further comprises:
- a third transistor having a first terminal configured to receive the supply voltage, wherein a control terminal of the third transistor is coupled to the bias circuit to receive the bias voltage, a second terminal of the third transistor is coupled to a supply voltage terminal of the amplifier, and a reference voltage terminal of the amplifier is configured to receive the second reference voltage.

* * * * *